United States Patent
Zamensky et al.

(10) Patent No.: US 6,325,863 B1
(45) Date of Patent: Dec. 4, 2001

(54) METHOD OF WASHING A VEHICLE

(75) Inventors: Andrew Zamensky; Kent Oltmann, both of Cedar Falls, IA (US)

(73) Assignee: Miracle Industries, Inc., Cambridge, OH (US)

( * ) Notice: Subject to any disclaimer, the term of this patent is extended or adjusted under 35 U.S.C. 154(b) by 0 days.

(21) Appl. No.: 09/650,404

(22) Filed: Aug. 29, 2000

Related U.S. Application Data

(62) Division of application No. 09/184,777, filed on Nov. 2, 1998, now Pat. No. 6,134,735.
(60) Provisional application No. 60/064,117, filed on Nov. 3, 1997.

(51) Int. Cl.[7] .................................. B08B 3/02; B60S 3/04
(52) U.S. Cl. ................................ 134/18; 134/34; 134/42; 134/45; 134/123; 134/172; 15/53.1; 15/97.3; 15/DIG. 2
(58) Field of Search .................................. 134/18, 34, 42, 134/45, 123, 172; 15/53.1, 53.2, 53.3, 53.4, 97.3, DIG. 2

(56) References Cited

U.S. PATENT DOCUMENTS

| | | |
|---|---|---|
| 3,496,908 | 2/1970 | Bernardi . |
| 3,543,774 | 12/1970 | Trasp . |
| 3,545,460 | 12/1970 | Daum et al. . |
| 3,594,842 | 7/1971 | Clark . |
| 3,688,784 | 9/1972 | Daum et al. . |
| 3,786,823 | 1/1974 | Wiley . |
| 4,809,720 | 3/1989 | Heraty . |
| 4,933,016 | 6/1990 | Carlson . |
| 5,033,490 | 7/1991 | Wade et al. . |
| 5,040,485 | 8/1991 | Balley et al. . |
| 5,226,436 | 7/1993 | Kirby . |
| 5,291,906 | 3/1994 | White . |
| 5,886,648 | 3/1999 | McElroy et al. . |

*Primary Examiner*—Zeinab El-Arini
(74) *Attorney, Agent, or Firm*—Burns, Doane, Swecker & Mathis, LLP

(57) ABSTRACT

A method of washing a vehicle is described which can accommodate vehicles having a wide variety of different lengths and does not require a motorized system to move the vehicle through the vehicle washing apparatus. The method includes the steps of moving a movable washing member around four sides of the vehicle by moving the washing member 360 degrees on a continuous track and the track moves longitudinally on a plurality of fixed rails, washing the vehicle with the movable washing member, and sensing a vehicle position and length and controlling motion of the track on the fixed rails based on the sensed vehicle position and length.

5 Claims, 6 Drawing Sheets

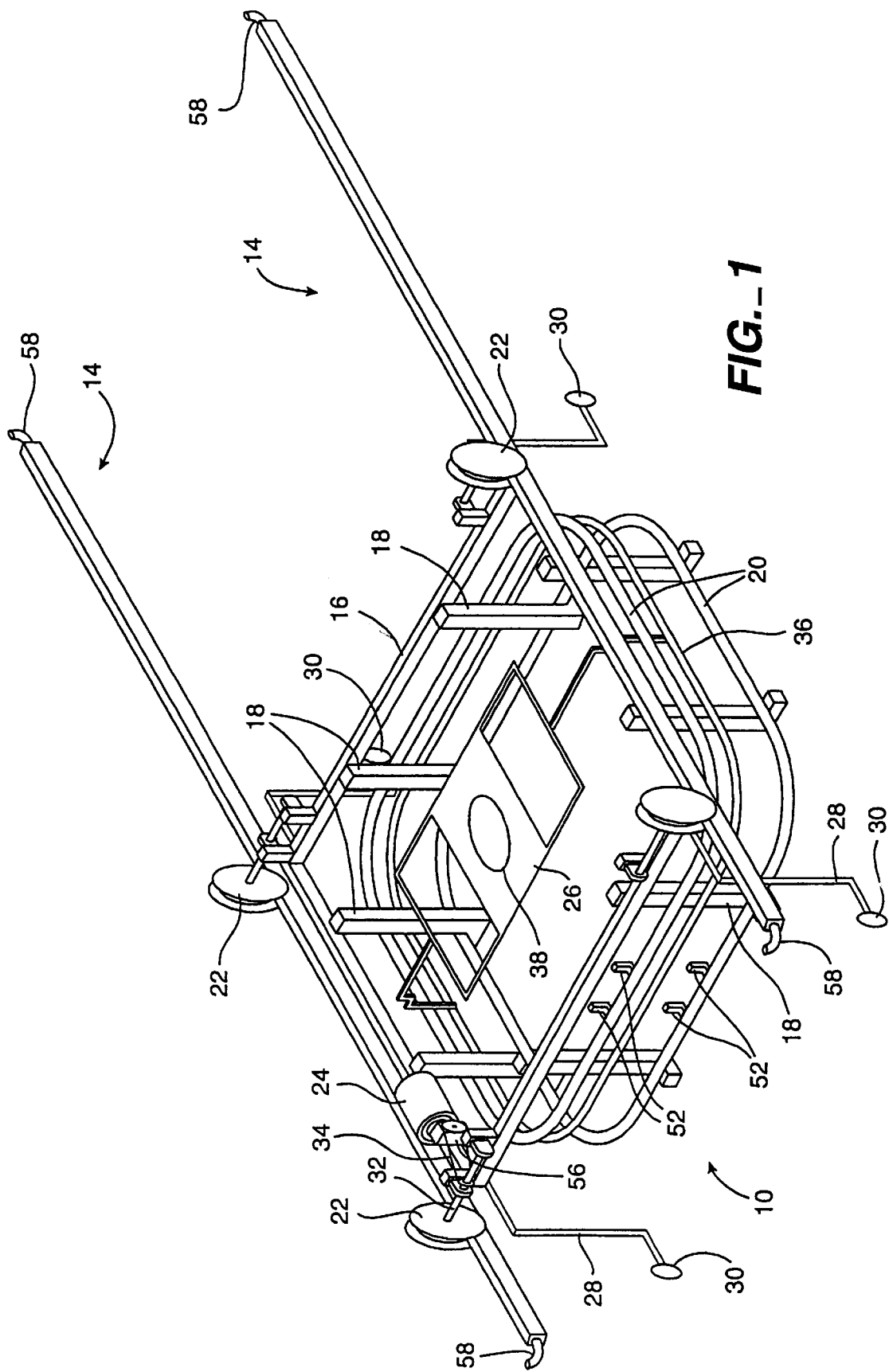

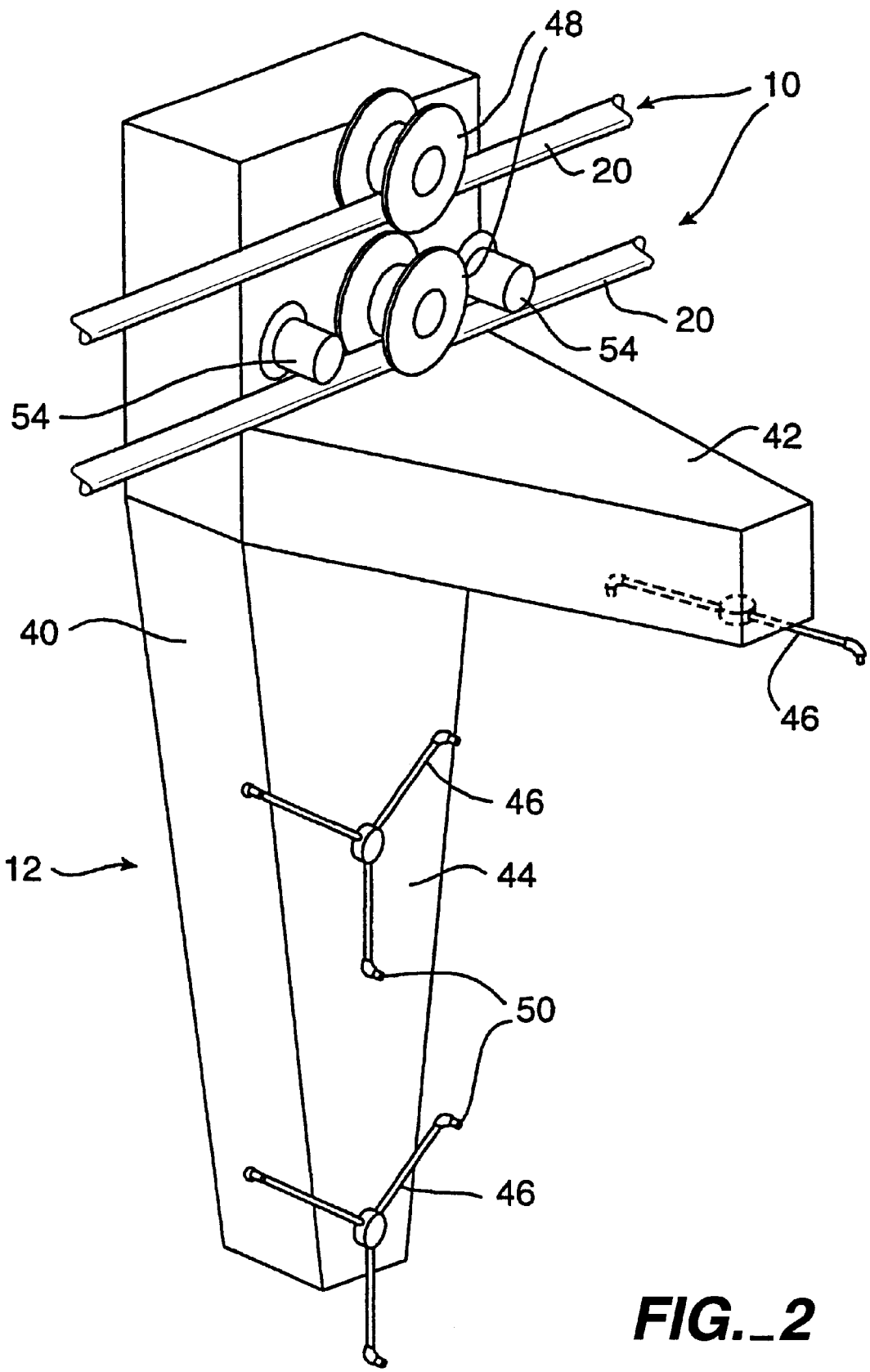
FIG._2

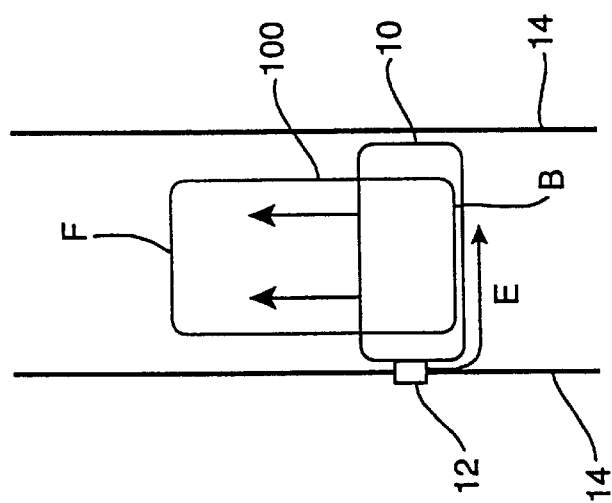
FIG._5
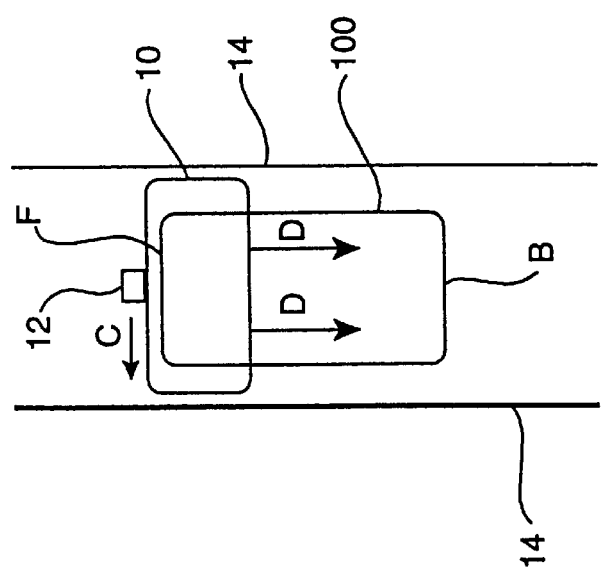
FIG._4
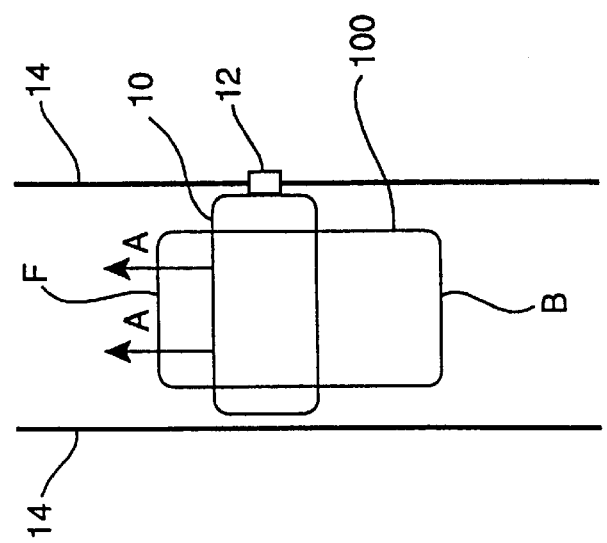
FIG._3

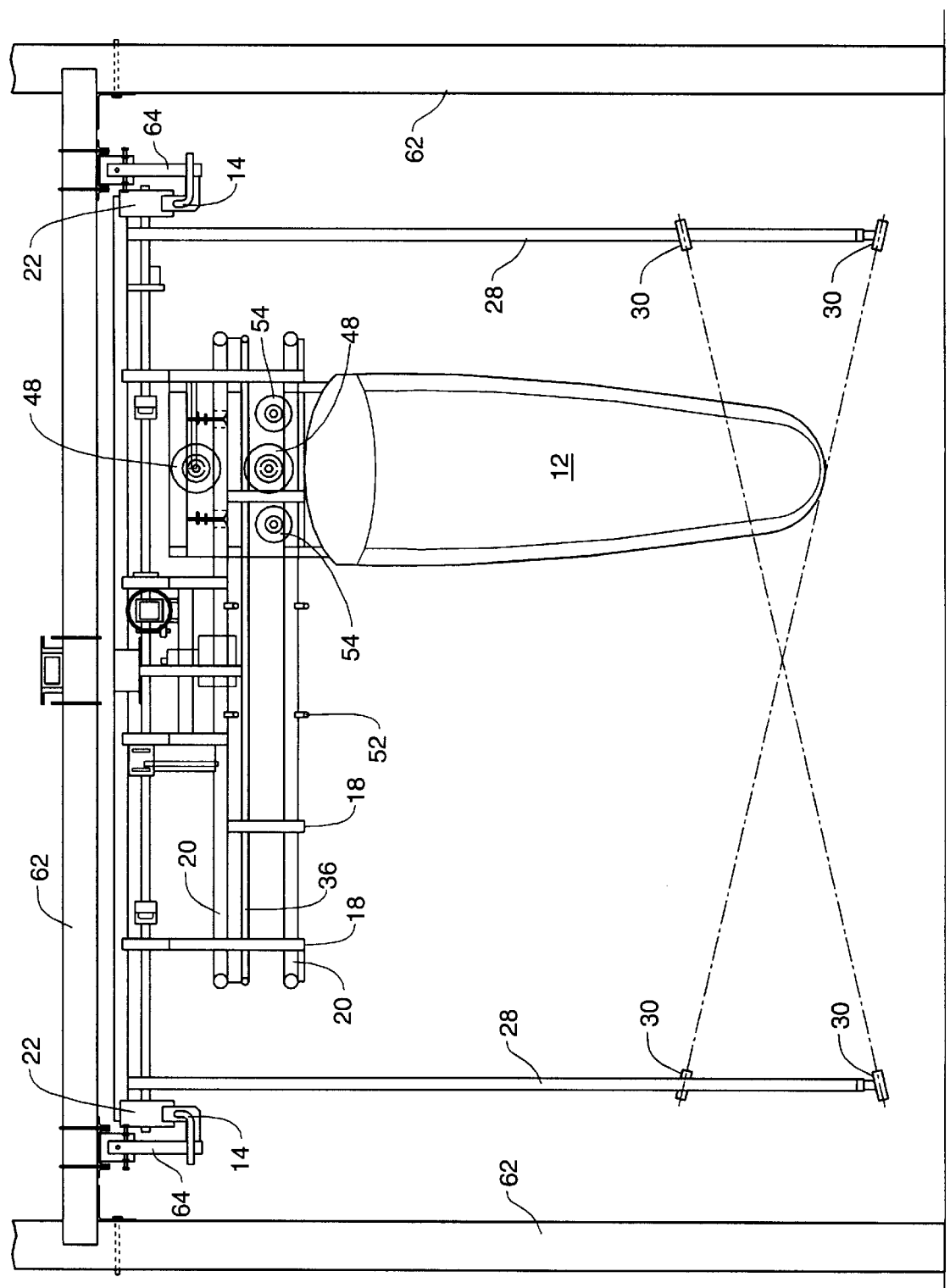
FIG._6

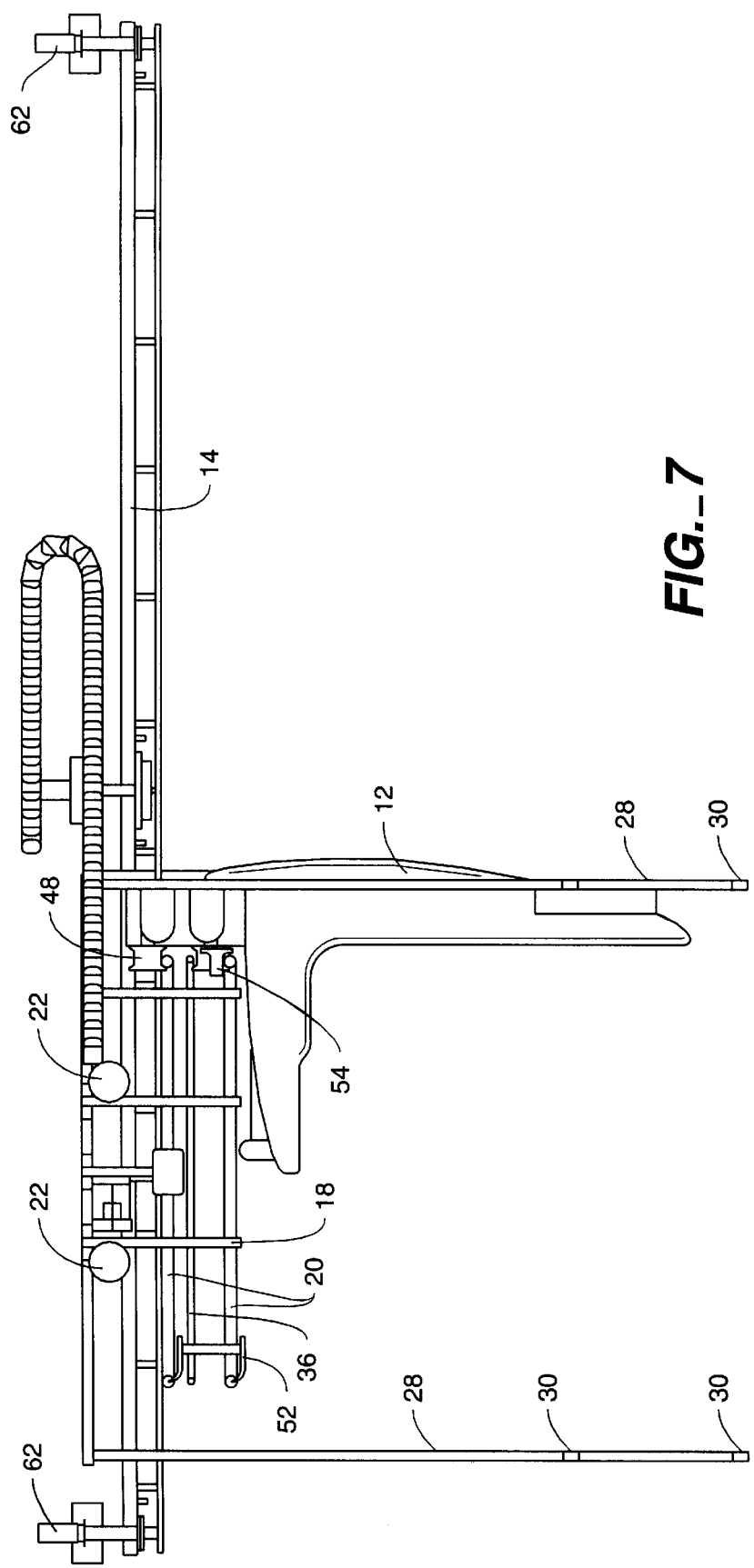
FIG._7

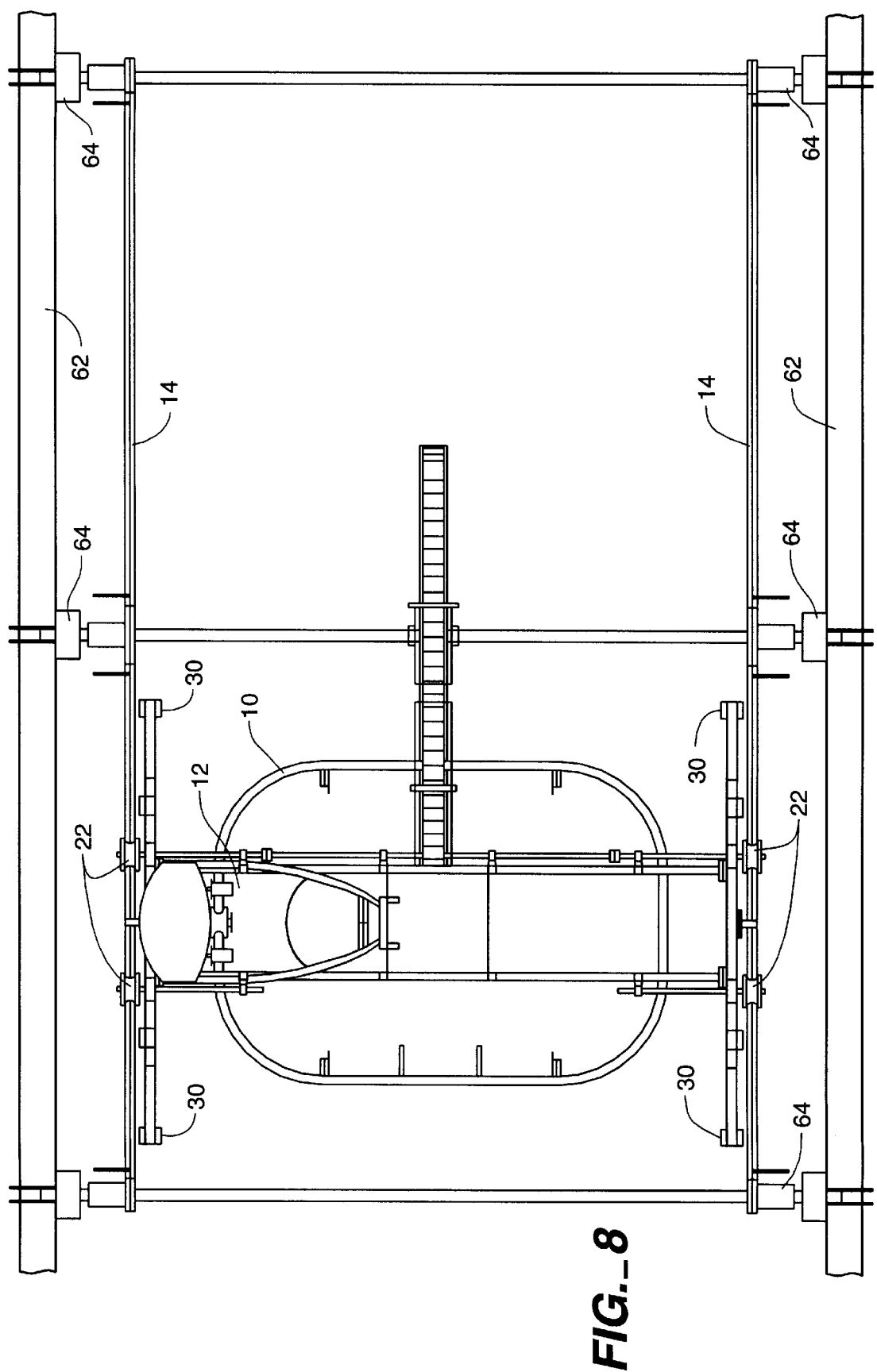
FIG._8

METHOD OF WASHING A VEHICLE

This application is a divisional of U.S. application Ser. No. 09/184,777, filed Nov. 2, 1998, now U.S. Pat. No. 6,134,735, which claims the benefit of U.S. Provisional Application Ser. No. 60/064,117, filed Nov. 3, 1997.

BACKGROUND OF THE INVENTION

1. Field of the Invention

The present invention relates to a vehicle washing apparatus for washing vehicles of different sizes, and more particularly, to a vehicle washing apparatus movable on an internally heated track to wash a vehicle while the vehicle remains stationary within the apparatus.

2. Description of the Related Art

Automatic vehicle washing systems come in two general types including movable washing systems and stationary washing systems. With the movable washing systems, a vehicle remains stationary in a car washing bay while the vehicle washing apparatus moves around the vehicle while washing the vehicle. In contrast, in stationary vehicle washing systems, the vehicle is moved by a motorized track through the stationary washing apparatus. The stationary washing systems may include a plurality of stations, such as, a washing station, a rinsing station, a wax application station, and a drying station. These stationary washing systems with multiple stations are generally larger and take up more space than the movable systems.

One example of a movable vehicle washing system includes an overhead track of a generally rectangular shape which is sized to correspond to the general size of the vehicles to be washed. A washing tower is movable on the overhead track and includes spray nozzles and/or brushes for cleaning the vehicle. The tower extends downward from the track and moves around the vehicle by wheels which travel along the rectangular shaped overhead track. However, these systems employing a movable tower for vehicle cleaning have a fixed track configuration and a single rectangular path along which the tower travels. Therefore, the track must be sized to accommodate the largest vehicle which is to be cleaned by the vehicle washing apparatus. Accordingly, when a vehicle is cleaned which is substantially smaller than the size of the track, the tower and spray nozzles will travel along a path which is much larger than the vehicle. With this system, some surfaces of the vehicle may not be adequately be cleaned. Particularly, the front and back of the vehicle will not be cleaned well if they are too far from the high pressure spray nozzles and/or brushes. In addition, some large vehicles may not be able to be accommodated in the movable washing system because the track size is too small for these vehicles.

Accordingly, it would be desirable to be able to accommodate vehicles of different lengths in a movable vehicle washing system by adjusting the system for different vehicle lengths.

SUMMARY OF THE INVENTION

The present invention relates to a vehicle washing apparatus which can accommodate vehicles having a wide variety of different lengths and does not require a motorized system to move the vehicle through the vehicle washing apparatus. The vehicle washing apparatus includes a movable washing member mounted for movement in a continuous path around a track. The entire track having the washing member mounted on the track is movable in a longitudinal direction along the length of a vehicle to accommodate vehicles of different lengths. The longitudinal movement of the track and the washing member are controlled based on a sensed length of the vehicle.

According to one aspect of the present invention, a vehicle washing apparatus includes a plurality of fixed rails, a track forming a continuous loop, the track mounted on the fixed rails and movable along the rails, and a movable washing member including a plurality of spray nozzles. The movable washing member is mounted for movement in a continuous path along the track.

According to another aspect of the present invention, a method of washing a vehicle includes the steps of positioning a vehicle stationary within a vehicle washing apparatus, and washing the vehicle with a movable washing tower which moves around four sides of the vehicle by moving the washing member 360 degrees on a continuous track and moving the track longitudinally on a plurality of fixed rails.

In accordance with a further aspect of the present invention, a method of washing a vehicle includes positioning a vehicle stationary within a vehicle washing apparatus, and moving a washing tower in a substantially rectangular path to wash the vehicle. A length of the substantially rectangular path is adjusted based on a size of the vehicle.

BRIEF DESCRIPTION OF THE DRAWING FIGURES

The invention will be described in greater detail with reference to the accompanying drawings in which like elements bear like reference numerals, and wherein:

FIG. 1 is a perspective view of the longitudinally movable track according to the present invention;

FIG. 2 is a perspective view of a tower for movement on the track according to the present invention;

FIGS. 3–5 are schematic top views showing the movable track and the tower positions with respect to a vehicle during the washing process according to the present invention;

FIG. 6 is a front view of an alternative embodiment of the vehicle washing apparatus;

FIG. 7 is a side view of the vehicle washing apparatus of FIG. 6; and

FIG. 8 is a top view of the vehicle washing apparatus of FIG. 6.

DETAILED DESCRIPTION OF THE PREFERRED EMBODIMENTS

The vehicle washing apparatus according to the present invention includes a substantially rectangular internally heated track 10, as shown in FIG. 1, and a vehicle washing tower 12 illustrated in FIG. 2 which is mounted movably on the track. The entire substantially rectangular track 10 is movable in a longitudinal direction along two parallel rails 14 of the washing apparatus to accommodate vehicles of different lengths.

As shown in FIG. 1, the track 10 includes a rectangular frame 16 and a plurality of L-shaped support members 18 extending from the frame. Mounted on the L-shaped support members 18 are two substantially rectangular track members 20 having rounded corners which define the path along which the washing tower 12 travels. The rectangular track members 20 are preferably formed of a round tube. A third substantially rectangular member or stabilizer 36 with rounded corners is positioned between the two track members 20 and provides stabilization of the washing tower 12 on the track 10.

The entire track 10 including the frame 16, the L-shaped support members 18, the rectangular members 20, and the stabilizer 36 is supported for longitudinal movement on the rails 14 by a plurality of wheels 22 which ride along the rails. The wheels 22 are each rotatably mounted on the track frame 16 by separate wheel axles 32. A motor 24 is connected to a gear box 56 which drives one or more of the wheels 22, preferably two of the wheels, to control the motion of the track 10 along the rails 14. The motor 24 and gear box 56 are connected to the axle 32 of one of the wheels 22 by a belt 34 or other transmission member. The motor 24 is controlled by a control system (not shown) depending on a sensed length of the vehicle determined by a sensing system described below.

A central support platform 26 is provided on the track 10 to support the electrical connections and water supply to the washing tower 12. Although the electrical and water supply connections to the washing tower 12 are not illustrated in the drawings for purposes of clarity, such connections would be known to those skilled in the art. The electrical connections and water supply hoses are preferably connected to a center pot which is received in a central opening 38 of the support platform 26 and includes a rotatable arm connecting the center pot to the tower 12 which allows the wiring and water supply to be delivered while the tower travels 360 degrees on the track 10.

The two rectangular track members 20 are preferably heated during use to prevent the vehicle washing apparatus from freezing up during winter operating conditions. According to one embodiment, the heating is provided by using hollow tubular track members 20 and internally heating the track members by passing warm water or other fluid through the track members during operation. The warm water is pumped into and out of the track members 20 through the fluid connections 52. The rails 14 may be similarly heated to prevent freezing by pumping warm water into the rails through the fluid connections 58.

Extending downward from the track 10 are a plurality of sensor arms 28 each having an eye 30 at a lower end thereof. The sensor arms 28 allow the determination of the location of the front and back of the vehicle. Preferably, the sensor arms 28 are arranged at the four corners of the track 10. Sensor arms 28 on opposite sides of the track 10 (beneath opposite rails 14) are different lengths so that the eyes 30 are positioned in a staggered arrangement. This staggered arrangement of the arms 28 allows the eyes 30 to sense the front and back of vehicles which are located at different heights.

According to one embodiment of the invention, the eyes 30 include a light emitter on one side of the vehicle and a light receiver of an opposite side of the vehicle. Accordingly, when the light emitted by the light emitter eye is not received by the light receiver eye, the washing system determines that a portion of the vehicle is located between the two eyes. However, when the light is received by the light receiver eye, the system determines that the vehicle is no longer positioned between the two eyes 30, thus, the system determines that the front or back of the vehicle has been cleared by the eyes.

Although the present invention has been described as employing optical sensors or eyes 30 including a light emitter and light receiver to sense the front and back of the vehicle, other types of known sensors may also be used. Other types of sensors include laser sensors, mechanical sensors, magnetic sensors, motion sensors, and the like.

The vehicle washing tower 12, as shown in FIG. 2, includes a tower body 40 having a horizontal arm 42 for washing a top surface of the vehicle and a vertical arm 44 for washing side, front, and back surfaces of the vehicle. Mounted on the horizontal and vertical arms 42, 44 are a plurality of rotatable wands 46 for injecting high pressure water or soapy water solution onto the vehicle. Each of the wands 46 include one or more nozzles 50 for delivering water and the wands rotate while delivering the water. Although the present invention has been illustrated as a brushless vehicle washing apparatus employing water delivery wands 46, it should be understood that other washing members, such as cloth brushes or other friction creating material, may also be used either alone or in combination with water delivery wands or other nozzles.

The vehicle washing tower 12 also includes two drive wheels 48 for supporting the tower on the rectangular track members 20. One of the drive wheels 48 supports the tower on each of the track members 20. Two guide wheels 54 are provided on either side of a lower one of the drive wheels 48 for balancing the tower 12 and preventing the tower from swaying or tipping. A tower motor (not shown) drives one or more of the drive wheels 48 to move the washing tower 12 along the track 10. The tower motor is controlled by the control system of the washing apparatus to cause the washing tower 12 to move along the track 10 at the appropriate times during the washing procedure.

In operation of the vehicle washing system according to the present invention, a vehicle is driven into the vehicle washing apparatus so that the vehicle is positioned beneath the track 10. The vehicle is parked and remains stationary during the washing procedure. The vehicle washing tower 12 moves around the stationary vehicle to wash the side, front, back, and top surfaces of the vehicle.

The operation of the vehicle washing apparatus is illustrated with respect to the schematic illustrations of FIGS. 3–5. As shown in FIG. 3, once the vehicle 100 is in place beneath the track 10 with the tower 12 located along the right side of the vehicle, the entire track 10 moves along the rails 14 by operation of the motor 24 in the direction indicated by the arrows A.

As the track 10 moves in the direction of the arrows A, the vehicle washing tower 12 washes a portion of the right side of the vehicle 100. When the eyes 30 sense that the vehicle 100 is no longer located between the two forward eyes, the track 10 continues to move a predetermined distance which allows the path of the washing tower 12 to clear a front F of the vehicle. Once the path of the tower 12 clears the front F of the vehicle 100, the longitudinal motion of the track 10 on the rails 14 stops. Then, the washing tower 12 moves around the front F of the vehicle 100 as shown in FIG. 4 along the track 10 in the direction of the arrow C. After washing the front F of the vehicle 100, the washing tower 12 moves along the track 10 down a portion of the left side of the vehicle. The washing tower 12 then remains stationary on the track 10 as the track moves in the direction of the arrows D along the rails 14.

When the track 10 reaches an opposite end of the vehicle 100, i.e., the back B of the vehicle, as sensed by the eyes 30, the track again moves a predetermined distance which allows the path of the washing tower 12 to clear the back B of the vehicle. Once the path of the tower 12 clears the back of the vehicle, the track 10 remains stationary on the rails 14 while the washing tower 12 moves around the back B of the vehicle on the track 10, as shown in FIG. 5 by the arrow E, until the tower reaches the right side of the vehicle. The washing tower 12 then remains stationary on the track 10 and the track moves forward washing the remainder of the right side of the vehicle and moving the washing tower back to the starting position shown in FIG. 3.

The operation of the motor 24 and the gear box 56 which move the track 10 on the rails and the tower motor which moves the washing tower 12 on the track are both controlled by the control system of the washing apparatus. Information is input to the control system by the operator and by the eyes 30. The predetermined distance that the track 10 moves after the eyes determine that the vehicle has been cleared will depend on the particular location and operation of the eyes 30 and the control system. However, the system is preferably designed to provide a clearance between the vehicle body and the washing tower 12 of about 6–24 inches, preferably approximately 12 inches.

Although the present invention has been described as including motion of the washing tower 12 from the right side of the vehicle 100 around the front F of the vehicle along the left side of the vehicle and around the back B of the vehicle, it should be understood that a variety of different motions are possible. For example, the tower 12 may move either in a counterclockwise or clockwise direction around the vehicle 100 and the starting point of the tower may be at any location around the circumference of the vehicle. However, the tower 12 preferably has a starting position along one of the sides of the vehicle 100 so that the vehicle can be driven beneath the track 10 without risking contact between the vehicle and the washing tower 12. The washing tower 12 may pass around the vehicle 100 one or more times during the washing operation.

FIGS. 6–8 illustrate one preferred embodiment of the vehicle washing apparatus including a vehicle washing tower of a modified shape. As shown in the top view of FIG. 8, the track 10 is a substantially rectangular track with rounded corners. The track is formed by two tubular heatable bars 20 and a stabilizer bar 36 connected by L-shaped support members 18. The vehicle washing tower 12 having brushes and/or nozzles is mounted on the track 10 by the wheels 48 and stabilized by the wheels 54. The entire track 10 is movable on the rails 14 by the wheels 22. The rails 14 are each supported by three support brackets 64 on a sturdy support structure 62 which is secured to the ground. As discussed above, the sensor arms 28 extend from the movable frame of the track 10 and the sensors 30 are positioned in a staggered arrangement to enable the sensors to accurately sense the ends of vehicles of differing heights. The vehicle washing apparatus of FIGS. 6–8 operates in the manner described above with respect to FIGS. 3–5.

While the invention has been described in detail with reference to a preferred embodiment thereof, it will be apparent to one skilled in the art the various changes and modifications can be made, and equivalents employed without departing from the spirit and scope of the invention.

What is claimed is:

1. A method of washing a vehicle comprising:

positioning a vehicle stationary within a vehicle washing apparatus;

moving a movable washing member around four sides of the vehicle, by moving the washing member 360 degrees on a continuous track and the track moves longitudinally on a plurality of fixed rails;

washing the vehicle with the movable washing member; and wherein a control system maintains a distance of about 6 to 24 inches between the vehicle and the washing member during washing.

2. A method of washing a vehicle comprising:

positioning a vehicle stationary within a vehicle washing apparatus;

moving a movable washing member around four sides of the vehicle by moving the washing member 360 degrees on a continuous track and the track moves longitudinally on a plurality of fixed rails;

washing the vehicle with the movable washing member; and sensing a vehicle position and length and controlling motion of the track on the fixed rails based on the sensed vehicle position and length.

3. A method of washing a vehicle comprising:

positioning a vehicle stationary within a vehicle washing apparatus;

moving a washing member in a substantially rectangular path to wash a vehicle, wherein a length of the substantially rectangular path is adjusted based on a size of the vehicle; and washing the vehicle with the movable washing member.

4. A method of washing a vehicle comprising:

positioning a vehicle stationary within a vehicle washing apparatus; and moving a washing member in a substantially rectangular path to wash a vehicle;

washing the vehicle with the movable washing member; and wherein a size of the vehicle is sensed by the vehicle washing apparatus and the length of the substantially rectangular path is adjusted accordingly.

5. The method of washing a vehicle of claim 4, wherein a control system maintains a distance of about 6 to 24 inches between the vehicle and the washing member during the washing.

* * * * *